Patented Apr. 18, 1939

2,155,038

UNITED STATES PATENT OFFICE 2,155,038

COMPOUNDS OF THE PHTHALOCYANINE SERIES

John Stanley Herbert Davies and Max Wyler, Manchester, and Paul Anthony Barrett and Reginald Patrick Linstead, London, England, assignors to Imperial Chemical Industries Limited, a corporation of Great Britain No Drawing. Application February 12, 1937, Serial No. 125,444

8 Claims. (Cl. 260—314)

This invention relates to novel compounds of the phthalocyanine series. It is an object of this invention to prepare novel compounds of the phthalocyanine series containing vanadium in chemical combination. It is a further object of this invention to provide practical chemical processes for the preparation of compounds of said series. Other and further important objects of this invention will appear as the description proceeds.

Compounds of the phthalocyanine series are at this date fairly well established in the art, having been described in various British and U. S. patents, as well as in certain scientific publications. Particularly noteworthy are British Patents Nos. 322,169, 389,842, and 410,814 and a series of articles published by Linstead et al. in the Journal of the Chemical Society for 1934, pp. 1016–1039. Nevertheless no vanadium containing phthalocyanines have heretofore been mentioned or described.

We have now found that a vanadium containing phthalocyanine, more correctly a vanadyl phthalocyanine, corresponding to the formula $(C_6H_4(CN)_2)_4VO$, may be readily prepared by subjecting phthalocyanine-forming initial material to a regular phthalocyanine synthesis in the presense of a reactive compound of vanadium.

By phthalocyanine-forming initial material we mean compounds of the phthalic anhydride, phthalamide, phthalimide or phthalonitrile series, as well as all their functional derivatives and nuclear substitution products, which according to the literature above mentioned are capable of undergoing self-condensation by themselves or in the presence of ammonia or in the presence of certain metals, such as copper, with or without the presence of further assistants such as ammonia or urea to give coloured compounds of the phthalocyanine series. The field of such material as disclosed by the above patents is vast and embraces such compounds as phthalic anhydride, phthalamide, phthalimide, ortho-cyanobenzamide, diammonium phthalate, nuclear substitution derivatives of these such as nitro or chloro, and further compounds which differ from the above by the addition or subtraction of $H_2O$ units, $NH_3$ units or both. In some cases phthalocyanine formation is due to or facilitated by the presence in the reacting mixture of ammonia or ammonium compounds, such as ammonium sulfamate, or also of urea.

In spite of its diversity, this group of compounds is closely inter-related in structure and is well defined in the literature above mentioned. It will therefore be generically designated hereinafter as phthalocyanine-forming initial material. Our present invention is workable with any of the aforesaid phthalocyanine-forming initial material, but differs from the art simply in the fact that the synthesis is carried out in the presence of a reactive vanadium compound.

By reactive vanadium compounds we refer to compounds such as oxides and chlorides of vanadium which are capable of yielding vanadium in reactions of exchange. As an oxide of vanadium we mention specifically vanadium pentoxide. As halides of vanadium we may employ either vanadium dichloride, $VCl_2$, or vanadium trichloride hexahydrate, $VCl_3.6H_2O$. Other halides of vanadium are, however, also applicable.

The vanadyl phthalocyanines differ from the known phthalocyanines in respect of shade; they possess a characteristic greenish blue shade.

The invention is illustrated but not limited by the following examples, in which parts are by weight.

Example 1

10 parts of phthalonitrile and 2 parts of vanadium pentoxide are mixed and the mixture is heated at 240–250° C. for about one-half hour.

The cooled mixture is pulverized and extracted with hot ethyl alcohol. A crystalline blue powder is obtained. The solution in concentrated sulphuric acid is orange brown. On diluting the solution in sulphuric acid with water, the compound is precipitated unchanged except in physical form, it being then finely divided and adapted to be used as a pigment. Crystallized from chloro-naphthalene it conforms to the formula $C_{32}H_{16}N_8OV$. Its properties as a pigment are as described in Example 2.

Example 2

37 parts of phthalic anhydride, 37 parts of urea, 15 parts of vanadium trichloride hexahydrate, are mixed and gradually heated to 250° till the liquid melt becomes nearly solid and the amount of colouring matter is not any more increased. After cooling the ground melt is extracted with hot dilute aqueous caustic soda, followed by extraction with hot dilute aqueous hydrochloric acid. A dark blue crystalline powder is obtained which applied as a pigment gives bright greenish blue shades. Yield: 50% calculated on the phthalic anhydride used.

It will be understood that our mode of procedure may be varied within wide limits, within the teachings of the aforesaid art as applied to phthalocyanine synthesis in general. In particular, the temperature of condensation is not limited to the ranges employed in the above examples, but may be varied from 180° C.–300° C. depending on the particular materials selected, diluting mediums and assistants present, etc. In general, the optimum temperature can be determined readily and simply by observing the rate of color formation.

We claim:

1. Vanadyl phthalocyanine, said compound being in substance a dark blue, crystalline solid, soluble in concentrated sulfuric acid with an orange brown color, but giving a bright-greenish shade when applied as a pigment, said compound corresponding in constitution to the empirical formula $[C_6H_4(CN)_2]_4 \cdot VO$.

2. The process of producing a coloring matter of the phthalocyanine series containing vanadium, which comprises subjecting phthalocyanine-forming initial material to phthalocyanine synthesis in the presence of a reactive vanadium compound.

3. The process of producing vanadyl phthalocyanine, which comprises heating a compound selected from the group consisting of phthalic anhydride, phthalamide, phthalimide, phthalic acid diammonium salt, nuclear substitution derivatives of these, and compounds derivable from any of the aforesaid by the addition or subtraction of $H_2O$ units, $NH_3$ units, or both, with a compound selected from the group consisting of vanadium halides and vanadium oxides, in the presence of urea.

4. The process of producing vanadyl phthalocyanine, which comprises heating phthalonitrile with vanadium pentoxide at a temperature above 200° C., until formation of coloring matter is substantially complete.

5. The process of producing vanadyl phthalocyanine, which comprises heating together phthalic anhydride, a chloride of vanadium and urea at a temperature between 180 and 300° C., and recovering the coloring matter thus produced.

6. The process of producing vanadyl phthalocyanine, which comprises heating together phthalic anhydride, vanadium trichloride hexahydrate and urea at a temperature of about 250° C. until formation of coloring matter is substantially complete.

7. A vanadium-phthalocyanine compound.

8. A phthalocyanine coloring matter having the structure of a metal-phthalocyanine in which the metal is vanadium.

JOHN STANLEY HERBERT DAVIES.
MAX WYLER.
PAUL ANTHONY BARRETT.
REGINALD PATRICK LINSTEAD.